United States Patent
Holzapfel et al.

(10) Patent No.: US 7,676,696 B2
(45) Date of Patent: Mar. 9, 2010

(54) FUNCTIONAL UNIT FOR CARRYING OUT LOGICAL TEST CASES ON A TEST SYSTEM INTERCONNECTED TO A UNIT TO BE TESTED AND CORRESPONDING METHOD

(75) Inventors: Gerald Holzapfel, Marbach (DE); Gerhard Filp, Freiberg (DE); Hakan Oezaslan, Ludwigsburg (DE); Frank Traenkle, Erdmannhausen (DE); Juergen Meyer, Dusslingen (DE); Tilo Allmendinger, Pfedelbach (DE); Uwe Gross, Weissach (DE); Alexander Bayerl, Auenwald-Hohenweiler (DE); Sven Goebel, Stuttgart (DE); Bernd Kretschmer, Stuttgart (DE); Klaus Lebert, Graz (AT); Ulrich Wolters, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 663 days.

(21) Appl. No.: 11/215,454

(22) Filed: Aug. 29, 2005

(65) Prior Publication Data
US 2006/0090100 A1  Apr. 27, 2006

(30) Foreign Application Priority Data
Aug. 27, 2004  (DE) ............ 10 2004 041 822

(51) Int. Cl.
*G06F 11/00* (2006.01)
(52) U.S. Cl. .................... 714/27; 714/25; 714/31; 714/38
(58) Field of Classification Search ............ 714/27
See application file for complete search history.

(56) References Cited

U.S. PATENT DOCUMENTS

| | | | |
|---|---|---|---|
| 5,557,740 A * | 9/1996 | Johnson et al. | 714/38 |
| 5,828,985 A * | 10/1998 | Sauer et al. | 702/122 |
| 6,282,678 B1 * | 8/2001 | Snay et al. | 714/712 |
| 6,321,376 B1 * | 11/2001 | Willis et al. | 717/124 |
| 6,463,552 B1 * | 10/2002 | Jibbe | 714/33 |
| 6,571,358 B1 * | 5/2003 | Culotta et al. | 714/33 |
| 6,898,784 B1 * | 5/2005 | Kossatchev et al. | 717/126 |
| 6,938,243 B1 * | 8/2005 | Zeevi et al. | 717/124 |
| 7,278,135 B2 * | 10/2007 | Czerwonka | 717/124 |
| 7,287,190 B2 * | 10/2007 | Rosenman et al. | 714/32 |
| 7,299,453 B2 * | 11/2007 | Sluiman et al. | 717/124 |
| 7,310,798 B1 * | 12/2007 | Gunara et al. | 717/135 |
| 7,334,219 B2 * | 2/2008 | Cebula et al. | 717/124 |
| 2002/0133807 A1 * | 9/2002 | Sluiman | 717/124 |
| 2002/0162059 A1 * | 10/2002 | McNeely et al. | 714/703 |
| 2003/0004697 A1 * | 1/2003 | Ferris | 703/13 |
| 2003/0217345 A1 * | 11/2003 | Rajsuman et al. | 716/6 |
| 2004/0103396 A1 * | 5/2004 | Nehab | 717/127 |
| 2004/0153793 A1 * | 8/2004 | Jarboe et al. | 714/27 |
| 2004/0225459 A1 * | 11/2004 | Krishnaswamy et al. | 702/57 |
| 2005/0022086 A1 * | 1/2005 | Kotz et al. | 714/742 |

(Continued)

*Primary Examiner*—Robert Beausoliel
*Assistant Examiner*—Charles Ehne
(74) *Attorney, Agent, or Firm*—Kenyon & Kenyon LLP

(57) ABSTRACT

A functional unit for carrying out logical test cases on a test system interconnected to a unit that is to be tested, the functional unit being suitable for being interconnected between the logical test cases and the test system in such a way that the logical test cases are decoupled from the test system, and, in this context, for supporting an execution of the logical test cases on the test system as mediator.

24 Claims, 1 Drawing Sheet

U.S. PATENT DOCUMENTS

2005/0097515 A1* 5/2005 Ribling ................ 717/124
2005/0229161 A1* 10/2005 Wang et al. .............. 717/125
2005/0283761 A1* 12/2005 Haas .................... 717/124
2006/0184826 A1* 8/2006 Argo et al. ................ 714/27
2006/0265691 A1* 11/2006 Klinger et al. ............ 717/124
2007/0028217 A1* 2/2007 Mishra et al. ............ 717/124
2007/0038890 A1* 2/2007 El Far et al. .............. 714/25
2008/0005723 A1* 1/2008 Zimmerer ................ 717/124
2008/0040709 A1* 2/2008 Blancha et al. .......... 717/130

* cited by examiner

FUNCTIONAL UNIT FOR CARRYING OUT LOGICAL TEST CASES ON A TEST SYSTEM INTERCONNECTED TO A UNIT TO BE TESTED AND CORRESPONDING METHOD

FIELD OF THE INVENTION

The present invention relates to a functional unit for carrying out logical test cases on a test system interconnected to a unit to be tested. The present invention also relates to a corresponding method.

BACKGROUND INFORMATION

Automated tests for electronic control systems have been widely introduced and are widely known these days. For the automation of tests of that kind, various techniques, pieces of equipment and strategies of different manufacturers and self-developed ones are used. In this context, the required interfaces between the test cases, which implement the automated tests, and the test system which produces the access to the unit to be tested, known from here on as the test specimen, are specific to the manufacturer and are proprietary.

This gives rise to a series of problems. For one thing, test cases are not able to be developed independently of the test system used. A change or an exchange of the test system used generally makes it necessary to adapt the test cases. Such an adaptation may, under certain circumstances, be very costly, since the test cases, in general, directly call up the proprietary interfaces of the test systems, and the interfaces of the respective test systems differ widely from one another. Because of this, the preparation of logical test cases that are independent of a respective test system is made more difficult. An exchange of tests or test cases between control unit manufacturers and their customers is only possible in a simple manner if both partners use identical test systems. In this context, the reuse of test cases is severely limited.

Furthermore, the reuse of test systems is also not possible in a simple way. Test cases have to be implemented in test description language or a test sequence control supported by the test system used. If a test description language or a test sequence control is not supported by the test system used, then first of all a costly transfer or port of the test cases into the language or sequential control supported by the test system has to take place before the test system is able to be used for the present test or test case. Under certain circumstances such a port is very costly or is not possible technically, so that the test system cannot be used for the test or the test cases.

Furthermore, in many known design approaches, a test case is, in addition, strictly connected to a certain variant of the unit to be tested, or the test specimen. Thus, in these cases, for example, concrete physical addresses are coded for access to input and output signals of the test specimen. The reuse of these test cases for various variants of the test specimen is made difficult thereby, or even impossible.

ETSI (European Telecommunications Standards Institute) has standardized a test description language designated as TTCN in ETSI ES 201 873-1 to -4. This test language makes possible the preparation of test cases independent of the test system used in this connection. The test system is accessed via so-called ports. In this context, a port is a set of signatures which will be designated as test steps below. A test step, in this context, is a certain function that may be called up by a test case in order to stimulate and gage a test specimen, such as an electronic control unit. In this context, for instance, a functionality may be involved that reads a fault storage of the test specimen or the control unit. TTCN-3 directly accesses the test system used via so-called system-under-test adapters or platform adapter. In this context, the two adapters, that is, the system-under-test adapter and the platform adapter, are components of the executable program generated from TTCN-3. Because of this, if there is a change in the test system, a new generation of the executable program is also necessary. Furthermore, the test steps able to be called up are limited to test description language TTCN-3.

SUMMARY OF THE INVENTION

According to the present invention, a functional unit for executing logical test cases on a test system interconnected with a unit that is to be tested, the functional unit being suitable for being interconnected between the logical test cases and the test system in such a way that the logical test cases are decoupled from the test system. In this context, the functional unit, in the form of a mediator, supports execution of the logical test cases on the test system.

Preferably, the functional unit according to the present invention is suitable for supporting the execution of logical, test-system-independent test cases on the test system. The functional unit according to the present invention, designated as test system abstraction layer, TSAL, decouples the test cases from the test system. Test cases may be developed independently of the respective test system. Consequently, one and the same test case is able to be executed on various test systems, even ones made by different manufacturers, without the necessity of an adaptation or a renewed translation of the test case.

In one especially preferred specific embodiment of the functional unit according to the present invention, the functional unit has a first interface for interconnecting test description languages and/or test sequential controls, in which the logical test cases are implemented, a second interface for registering logical test steps that are independent of the test system, which are able to be called in by the logical test cases, and a third interface for interconnecting the test system and for mapping calls of logical test steps into calls to the test system.

Test cases for electronic control units stimulate and gage the test specimen by calling in test steps. Examples of such test steps are functions which read the fault storage of a control unit, or functions that set an environmental temperature or a setpoint speed of a vehicle. So-called test tools implement the test steps in software or hardware. The totality of all test tools for a control unit test is designated as a test system. The access to the test specimen, which may be present in hardware, in software or as a simulation model, takes place exclusively via such test tools. In general, test steps are grouped into categories, so-called ports, as was explained at the beginning. Thus, for example, all test steps which manage an access to a control unit diagnosis, are combined in a port P_diagram. A combination of all test steps into an access to a driver-vehicle-surroundings simulation model results in a port P_MA. Such a simulation model is required for operating the test specimen and as a test reference.

In an additional preferred specific embodiment of the functional unit according to the present invention, any test description languages and/or test sequential controls are interconnectible via the first interface, using respectively suitable adapters. This means that test cases may be implemented in any test description languages or test sequential controls. Interconnection of the test description languages and/or the test sequential controls to the functional unit according to the present invention takes place via so-called test language adapters. For each test description language one such test language adapter has to be implemented. The first interface is also designated as test language interface, since a registration and communication with the test language adapters takes place via this interface.

In one additional preferred specific embodiment of the functional unit according to the present invention, individual and/or logical test steps grouped into categories are able to be declared via the second interface, and are able to be called in for executing logical test cases. The second interface is designated, in this context, as a so-called test steps interface.

In one additional preferred specific embodiment of the functional unit according to the present invention, any test tools defining the test system are interconnectible via the third interface, using respectively suitable adapters. Consequently, an implementation of so-called tool adapters presents the possibility of connecting any test tools to the functional unit according to the present invention. Registration and communication with the tool adapters takes place via the third interface, which is denoted as tool adapter interface. The tool adapters convert calls to the test steps into actual functional calls to the test tools. Consequently, a tools adapter corresponds to an actual form of one or more ports.

Preferably, in addition, an interconnection of the individual logical test steps and/or the logical test steps grouped into categories and of the test tools interconnected to the functional unit is able to be configured. For a change of the interconnection, in this context, neither an adaptation of the test cases nor an adaptation of the test tools or the corresponding tool adapter is necessary.

In one additional preferred specific embodiment of the functional unit according to the present invention, a functionality is provided whereby logical addresses used by logical test cases are able to be mapped into physical addresses. In case of the use of functional units according to the present invention, abstract logical addresses are used in the test cases. The functional unit according to the present invention now maps these logical addresses into physical addresses. This is preferably carried out via configurable translation tables. These, in turn, are stored in the functional unit.

In addition, preferably, a functionality is provided whereby a recalculation of physical units may be undertaken. That means that in the test cases physical units for parameters and variables may be used independently of which units are used in the test tools. The recalculation of the units takes place in the functional unit according to the present invention. Consequently, the functional unit according to the present invention decouples test cases from the actual test specimen. Test cases for test specimens may be reused in various developmental versions and in various configurations. Thus, for example, a vehicle dynamics control unit may be used for various vehicle types. By the use of the functional unit according to the present invention, it is possible to set up a library of reusable logical test cases. When the test cases are reused, no adaptation of the test cases is necessary. In this context, preferably, the recalculation takes place automatically, so that, for instance, in a test case, as the unit for speed "m/s" may be used, and in a simulation model within the test system, "km/h" may be used. The test case does not have to know the unit used in the simulation model.

The present invention also relates to a method for carrying out logical test cases on a test system interconnected to a unit to be tested. In this context, the functional unit is interconnected between the logical test cases and the test system in such a way that the logical test cases are decoupled from the test system and from the unit to be tested.

Preferably, a functional unit according to the present invention described above is used as the functional unit.

In one additional especially preferred specific embodiment of the method according to the present invention, via the second interface of the functional unit, individual test steps and/or logical test steps grouped into categories are made available declared for the execution of logical test cases.

The computer program according to the present invention includes program code means for carrying out the method. These program code means are, for instance, stored on a computer-readable data carrier.

The method according to the present invention as well as the functional unit according to the present invention are independent of which state of development the unit to be tested or the test specimen are in. That means that the test specimen may be present as a control unit in hardware or a component of the control unit software or a simulation model of the control unit.

DETAILED DESCRIPTION

Figure 1:
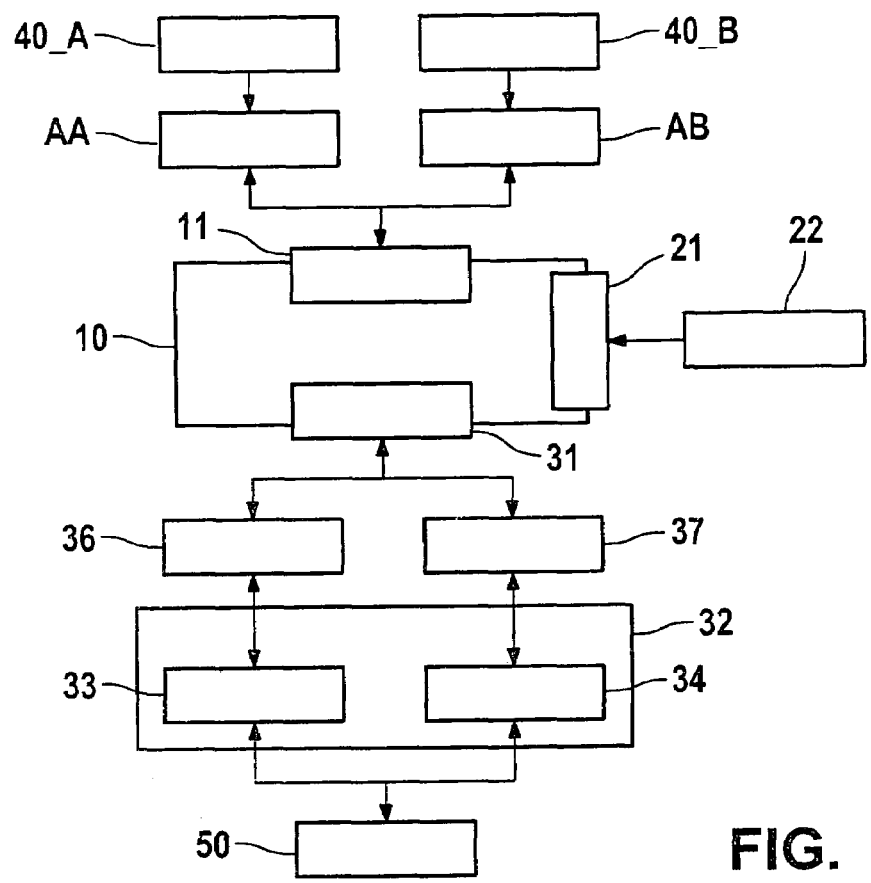
FIG. 1 shows a schematic representation of a specific embodiment of the method according to the present invention.

FIG. 1 shows a functional unit TSAL 10 according to the present invention. TSAL 10 has three interfaces available. In this context, first interface 11 is used for interconnecting any test description languages or test sequential controls in which the logical test cases are implemented. In order to interconnect a test case 40_A, which is implemented in a test description language A, a so-called test language adapter AA is preconnected to interface 11. In order to interconnect a test case 40_B, which is implemented in a test description language B, further a so-called test language adapter AB is preconnected to interface 11. A second interface 21 is used for a registration of logical test steps, that are independent of the test system, which are able to be called in by logical test cases. Via interface 21, which is also designated as test steps interface, the possibility arises of declaring ports and their test steps 22. After the declaration has taken place, the ports and test steps 22 may be used, that is, called in by the test cases. A test system 32 is interconnected via third interface 31. In the present case, test system 32 is formed by a test tool 33 and a test tool 34. Test tools 33 and 34 are connected to functional unit 10 by appropriate tool adapters 36 and 37. Registration and communication with tool adapters 36, 37 take place via third interface 31, which is also denoted as tool adapter interface. Tool adapters 36, 37 convert calls to the test steps 22 into actual functional calls to test tools 33, 34. A tool adapter corresponds to a concrete form of one or more ports.

Figure 2:
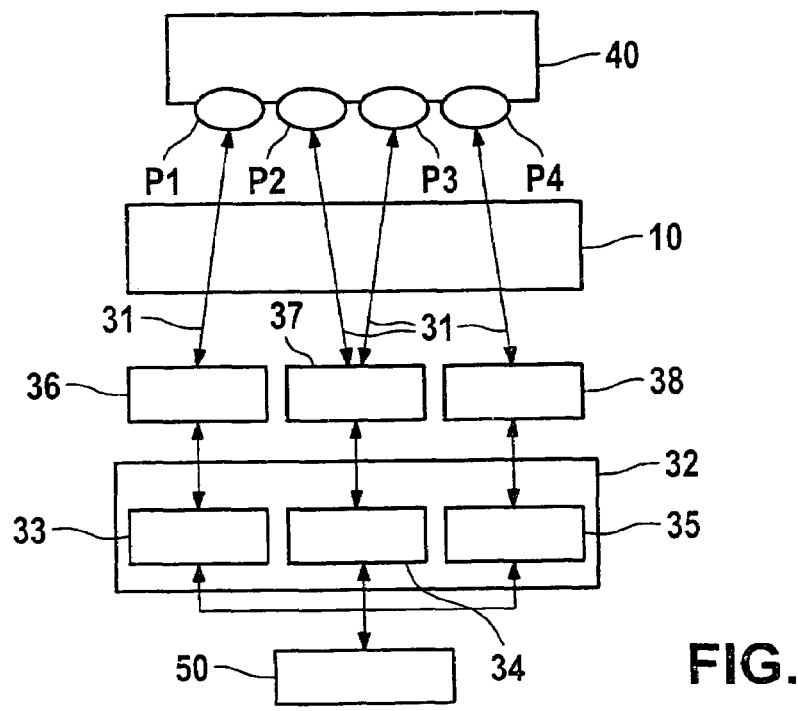
FIG. 2 shows a schematic representation of an additional specific embodiment of the method according to the present invention.

FIG. 2 also shows functional unit TSAL 10. Furthermore, four ports P1, P2, P3 and P4 are shown which are used by a logical test case. Also, functional unit 10 is connected via interface 31 to three different tool adapters 36, 37, 38, which, in turn, are connected to corresponding test tools 33, 34, 35 that form test system 32. Finally, access to unit 50, that is to be tested, takes place via test tools 33, 34, 35. Within functional unit TSAL 10, it is now possible to configure an assignment of individual ports P1, P2, P3, P4 to individual test tools 33, 34, 35. Consequently, an interconnection takes place from ports P1, P2, P3, P4 with corresponding tool adapters 36, 37, 38, which is made discernable by thin arrows. In the case represented here, port P1 is interconnected via tool adapter 36 to test tool 33. Port P2 and port P3 are interconnected via tool adapter 37 to test tool 34, and port P4 is interconnected via tool adapter 38 to test tool 35. The actual interconnection, in this context, takes place within functional unit 10. For a change in the intended interconnection, neither an adaptation of test case 40 nor an adaptation of tool adapters 36, 37, 38 is necessary, since the interconnection is undertaken exclusively within functional unit TSAL 10. Test tools 33, 34, 35 and their configuration may be exchanged without having to adapt test case 40. Consequently, once a test case 40 has been prepared, it is able to be run on any test tools 33, 34, 35, as long as test tools 33, 34, 35 are supported by functional unit TSAL 10. Logical addresses that are used in test case 40 are mapped into physical addresses using functional unit TSAL 10. By doing this, a decoupling of test case 40 is achieved, both from test tools 33, 34, 35 and from the actual execution of unit 50 that is to be tested. An example of a logical address would be "vehicle speed", which is mapped into the physical address "model.vehicle.speed". Furthermore, physical units used within functional unit TSAL 10 by test case 40 are automatically converted for parameters and variables, so that they may be used by test tools 33, 34, 35. That means that physical units are automatically converted, so that, for instance, in a test case 40, as the unit for speed "m/s" may be used, and in a simulation model within test system 32, "km/h" may be used. In this context, test case 40 does not have to know the unit used in the simulation model.

What is claimed is:

1. A functional unit for carrying out a logical test case on a test system interconnected to a unit to be tested, comprising:
    a structure;
    an arrangement for interconnecting the structure between the logical test case and the test system in such a way that the logical test case is capable of being decoupled from the test system;
    an arrangement for supporting an execution of the logical test case on the test system as mediator;
    an arrangement for configuring an interconnection of at least one of an interconnected individual logical test step and a logical test step grouped into a category with an interconnected test tool;
    a plurality of test tool adapters each connecting a respective test tool to the functional unit and converting calls to the at least one of an interconnected individual logical test step and a logical test step grouped into a category into calls to the respective test tool;
    a first interface for interconnecting at least one of a test description language and a test sequential control, in which the logical test case is implemented; and
    a plurality of test language adapters each corresponding to a respective test description language or test sequential control and connected to the first interface in order to interconnect logical test cases;
    wherein the logical test case is independent of the test system.

2. The functional unit as recited in claim 1, further comprising:
    a second interface for registering a logical test step that is independent of the test system, the logical test step being callable by the logical test case; and
    a third interface for interconnecting the test system and for mapping a call by the logical test step into a call to the test system.

3. The functional unit as recited in claim 1, further comprising:
    an adapter, wherein:
        at least one of the test description language and the test sequential control is able to be interconnected via the first interface while using the adapter.

4. The functional unit as recited in claim 3, wherein:
    a test tool that specifies the test system is able to be interconnected via the third interface while using the adapter.

5. The functional unit as recited in claim 1, wherein:
    at least one of an individual logical test step and a logical test step grouped into a category are able to be declared and called in for executing the logical test case.

6. The functional unit as recited in claim 1, further comprising:
    an arrangement for mapping into a physical address a logical address used by the logical test case.

7. The functional unit as recited in claim 1, further comprising:
    an arrangement for recalculating of a physical unit.

8. A method for carrying out a logical test case on a test system interconnected to a unit to be tested, comprising:
    interconnecting a functional unit between the logical test case and the test system in such a way that the logical test case is capable of being decoupled from the test system and from the unit to be tested;
    interconnecting at least one of an interconnected individual logical test step and a logical test step grouped into a category with an interconnected test tool;
    providing a plurality of test tool adapters each connecting a respective test tool to the functional unit and converting calls to the at least one of an interconnected individual logical test step and a logical test step grouped into a category into calls to the respective test tool;
    interconnecting, using a first interface, at least one of a test description language and a test sequential control, in which the logical test case is implemented; and
    providing a plurality of test language adapters each corresponding to a respective test description language or test sequential control and connected to the first interface to interconnect logical test cases;
    wherein the logical test case is independent of the test system.

9. The method as recited in claim 8, further comprising:
    declaring at least one of an individual logical test step and a logical test step grouped into a category via a first interface of the functional unit; and
    making at least one of the individual logical test step and the logical test step grouped into the category for executing the logical test case.

10. The method of claim 8, wherein:
    a second interface is used for registering a logical test step, which is independent of the test system, the logical test step being callable by the logical test case; and
    a third interface is used for interconnecting the test system and for mapping a call by the logical test step into a call to the test system.

11. The method of claim 8, wherein at least one of the test description language and the test sequential control is interconnectable via the first interface while using an adapter.

12. The method of claim 11, wherein a test tool that specifies the test system is interconnectable via the third interface while using the adapter.

13. The method of claim 8, wherein at least one of an individual logical test step and a logical test step grouped into a category are able to be declared and called in for executing the logical test case.

14. The method of claim 8, wherein an arrangement is used for mapping into a physical address a logical address used by the logical test case.

15. The method of claim 8, wherein an arrangement is used for recalculating of a physical unit.

16. The method of claim 8, further comprising:
    declaring at least one of an individual logical test step and a logical test step grouped into a category via a first interface of the functional unit; and
    making at least one of the individual logical test step and the logical test step grouped into the category for executing the logical test case.

17. A tangible computer readable medium having a computer program, which is executable on a computer, comprising:
    a program code arrangement having program code to perform the following:
        interconnecting a functional unit between a logical test case and a test system so that the logical test case is capable of being decoupled from the test system and from a unit to be tested, wherein the logical test case is independent of the test system;
    wherein a configuring arrangement configures an interconnection of at least one of an interconnected individual logical test step and a logical test step grouped into a category with an interconnected test tool,
    wherein each of a plurality of test tool adapters connect a respective test tool to the functional unit and convert calls to the at least one of an interconnected individual logical test step and a logical test step grouped into a category into calls to the respective test tool,
    wherein a first interface is used for interconnecting at least one of a test description language and a test sequential control, in which the logical test case is implemented, and
    wherein each of a plurality of test language adapters correspond to a respective test description language or test sequential control and is connected to the first interface to interconnect logical test cases.

18. The computer readable medium of claim 17, wherein:
    a second interface is used for registering a logical test step, which is independent of the test system, the logical test step being callable by the logical test case; and
    a third interface is used for interconnecting the test system and for mapping a call by the logical test step into a call to the test system.

19. The computer readable medium of claim 17, wherein at least one of the test description language and the test sequential control is interconnectable via the first interface while using an adapter.

20. The computer readable medium of claim 19, wherein a test tool that specifies the test system is interconnectable via the third interface while using the adapter.

21. The computer readable medium of claim 17, wherein at least one of an individual logical test step and a logical test step grouped into a category are able to be declared and called in for executing the logical test case.

22. The computer readable medium of claim 17, wherein an arrangement is used for mapping into a physical address a logical address used by the logical test case.

23. The computer readable medium of claim 17, wherein an arrangement is used for recalculating of a physical unit.

24. The computer readable medium of claim 17, further comprising:
    declaring at least one of an individual logical test step and a logical test step grouped into a category via a first interface of the functional unit; and
    making at least one of the individual logical test step and the logical test step grouped into the category for executing the logical test case.

* * * * *